April 29, 1958 L. A. ULE 2,832,937
TIME DOMAIN CIRCUITS FOR FILTERING SIGNALS EXPRESSIBLE
AS SOLUTIONS TO LINEAR HOMOGENEOUS DIFFERENTIAL
EQUATIONS WITH CONSTANT COEFFICIENTS
Filed Sept. 26, 1955 3 Sheets-Sheet 1

LOUIS A. ULE
INVENTOR.

BY
Edward J. Kendrick
ATTORNEY

April 29, 1958

L. A. ULE 2,832,937

TIME DOMAIN CIRCUITS FOR FILTERING SIGNALS EXPRESSIBLE
AS SOLUTIONS TO LINEAR HOMOGENEOUS DIFFERENTIAL
EQUATIONS WITH CONSTANT COEFFICIENTS

Filed Sept. 26, 1955

LOUIS A. ULE
INVENTOR.

BY
Edward J. Kendrick
ATTORNEY

April 29, 1958   L. A. ULE   2,832,937
TIME DOMAIN CIRCUITS FOR FILTERING SIGNALS EXPRESSIBLE
AS SOLUTIONS TO LINEAR HOMOGENEOUS DIFFERENTIAL
EQUATIONS WITH CONSTANT COEFFICIENTS
Filed Sept. 26, 1955   3 Sheets-Sheet 3

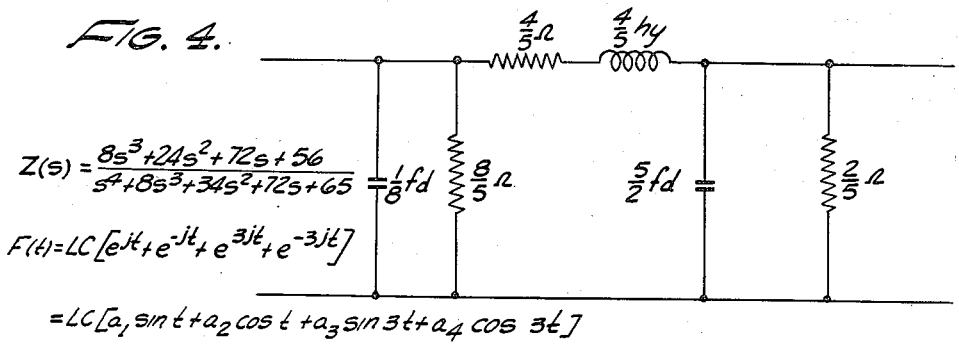

FIG. 4.

$$Z(s) = \frac{8s^3 + 24s^2 + 72s + 56}{s^4 + 8s^3 + 34s^2 + 72s + 65}$$

$$F(t) = LC[e^{jt} + e^{-jt} + e^{3jt} + e^{-3jt}]$$

$$= LC[a_1 \sin t + a_2 \cos t + a_3 \sin 3t + a_4 \cos 3t]$$

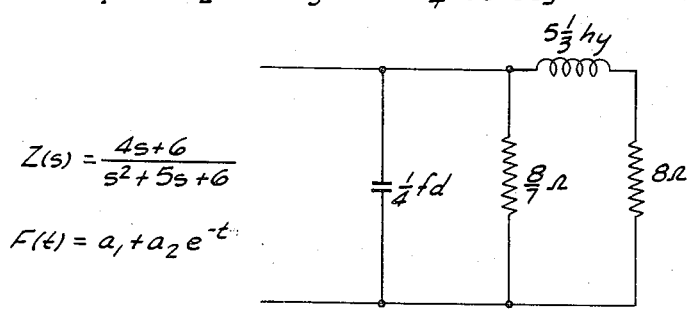

$$Z(s) = \frac{4s + 6}{s^2 + 5s + 6}$$

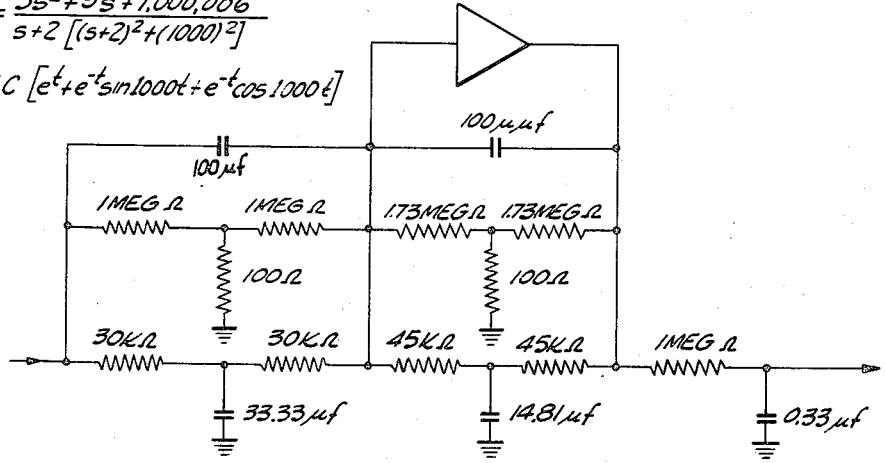

$$Z(s) = \frac{3s^2 + 9s + 1{,}000{,}006}{s + 2[(s+2)^2 + (1000)^2]}$$

$$F(t) = LC[e^t + e^{-t} \sin 1000t + e^{-t} \cos 1000t]$$

FIG. 6.

LOUIS A. ULE
INVENTOR.

BY Elwood A. Kendrick
ATTORNEY

United States Patent Office 2,832,937
Patented Apr. 29, 1958

2,832,937

TIME DOMAIN CIRCUITS FOR FILTERING SIGNALS EXPRESSIBLE AS SOLUTIONS TO LINEAR HOMOGENEOUS DIFFERENTIAL EQUATIONS WITH CONSTANT COEFFICIENTS

Louis A. Ule, Alhambra, Calif., assignor to Gilfillan Bros. Inc., Los Angeles, Calif., a corporation of California Application September 26, 1955, Serial No. 536,612

8 Claims. (Cl. 333—70)

This invention relates to time domain filtering circuits and, more particularly, to a class of linear filter circuits adapted for smoothing, predicting, and other operations in accordance with a weighted least squares formula. In further particular, the invention contemplates circuits which may be designed to pass a linear combination of arbitrary time varying signals which may be specified as solutions to linear homogeneous differential equations with constant coefficients.

Other approaches have been made towards providing filters adapted for various prediction and smoothing problems. In particular, reference is made to an article in the Journal of Applied Physics, July 1950, by Zadeh and Ragazzini entitled "An extension of Wiener's theory of prediction." In this article a solution is obtained for a different type of problem than that approached herein in that the signals dealt with therein are specified only in terms of a polynomial series.

The general approach of Zadeh and Ragazzini differs substantially from that considered herein since their approach requires that a time variant signal such as a sinusoid must be treated as an infinite polynomial series. It will be shown, on the other hand, that such signals may be treated directly in accordance with the present invention and further that a linear combination of a plurality of signals forming solutions to linear homogeneous differential equations may be filtered simultaneously.

Another practical limitation in the prediction approach of Zadeh and Ragazzini is that the particular solution provided requires a memory device which may be a delay line, for its synthesis, and does not achieve prediction and smoothing by means of lumped filter elements only. (A lumped filter element is either a coil, a capacitor or a resistor.) This means that additional equipment such as magnetic tape or ultrasonic delay lines, is required for the memory device and consequently the synthesis may not be achieved through simple components such as resistors, inductors, and capacitors, as in embodiments of the present invention.

The present invention obviates the above and other disadvantages inherent in previous approaches in providing filters for operating upon time varying signals which form solutions to linear homogeneous differential equations with constant coefficients. The technique of the invention thus allows the direct synthesis of circuits which may operate upon various linear combinations of one or more time varying signals such as sinusoids, exponentials, step functions, and time varying signals of various powers.

According to the theory of the invention, the filters are arranged to minimize the integral:

$$I = \int_{-\infty}^{0} \left[ M(t) - \sum_{i=1}^{n} a_i f_i(t) \right] H(t) dt$$

The functions $a_i f_i(t)$ are any $n$ linearly independent solutions to a particular $n$th order linear homogeneous differential equation with constant coefficients. It is presumed further that the input signal $M(t)$ could be exactly represented in this manner if it were not contaminated by error. In the event of no error, of course, the minimum value of the integral I is zero. The signal function $H(t)$ is an error weighting function which serves two purposes: (1) It permits us to emphasize the contribution of the data $M(t)$ to the output circuit of the filter at those times when these data are known to be most reliable. (2) It permits us to consider an infinite interval and consequently by suitable choice of $H(t)$ to realize the filter as finite lumped constant apparatus.

Since the quantity I being minimized is the weighted squared error, the desired filter is of the least squares type. The general form of this filter may be represented as the Laplace transform of the weighting function $W(x, t)$:

$$Z(x, s) = \int_0^\infty e^{-st} W(x, t) dt$$

where $W(x, t)$ will be shown to be defined by the function:

$$W(x, t) = H(-t) \sum_{j=1}^{n} \sum_{k=1}^{n} f_k(-t) c_{jk} f_j(x)$$

the parameter $x$ being the prediction time of the filter in seconds. For zero prediction time the parameter $x$ is set to zero although it may be a positive or negative number. In this expression all terms are defined as above. The matrix of the coefficients $c_{jk}$ is the inverse of the matrix of the coefficients $b_{ij}$ defined as follows:

$$b_{ij} = \int_{-\infty}^{0} H(t) f_i(t) f_j(t) dt$$

It will be shown in the detailed description which follows that an important corollary of this theory is that for the particular choice of, $H(t) = e^{at}$, where $a$ is a positive real constant, the resulting filters are always realizable as a driving point impedance to a ladder network of lossy coils and lossy condensers. This will be shown to have two useful practical implications:

(1) The ladder may always be synthesized by a continued fraction expansion of the Laplace transform $W(0, t)$. This synthesis procedure appears to be easier than any other presently known.

(2) Since the particular inductors and condensers specified by the resulting impedance functions are all lossy, the circuit may readily be synthesized with practical components.

In general terms then the invention provides a class of filters for operating in smoothing and predicting upon an input signal $M(t)$ to derive therefrom the expected output signals which may be referred to herein as $S(t)$, defined as a summation:

$$S(t) = \sum_{i=1}^{n} a_i f_i(t)$$

The technique of the invention thus provides a least squares approach to the problem which is weighted through the function $H(t)$ so as to result in structure which may be synthesized through simple means.

Furthermore, as is more clearly shown below, the prediction parameter $x$ allows a filter of simple passive elements to perform a prediction function wherein these elements inherently provide a memory. Thus effectively a capacitor is utilized in accordance with the invention to store information whereas the above-mentioned prediction devices require more complicated devices.

Accordingly, it is an object of the present invention to provide filter circuits adapted for smoothing, predicting, and other operations in accordance with a weighted least squares formula.

Another object is to provide circuits which may pass one or more time varying signals which may be specified as solutions to linear homogeneous differential equations with constant coefficients.

A further object is to provide filters which are readily realizable through practical components and yet are adapted to pass a plurality of linearly combined time varying signals which may be specified as solutions to linear homogeneous differential equations with constant coefficients.

Yet another object is to provide filter circuits capable of prediction but which do not require delay line or other memory devices but rather achieve prediction through the inherent memory characteristic of filter components, such as capacitors and the like.

Still a further object of the invention is to provide a class of filters which may be directly synthesized to operate upon a finite number of linearly combined time varying signals.

A more specific object of the invention is to provide a weighted least squares type of filter circuit adapted in a combination of such time varying signals as sinusoids, exponentials, step functions, and power functions of time, all of which may be solutions to linear homogeneous differential equations having constant coefficients.

The novel features which are believed to be characteristic of the invention, together with further objects, will be better understood from the following description considered in connection with the accompanying drawings included for illustration only and not as a definition of the limits of the invention.

Figs. 1b and 1c illustrate forms of networks for passing the signal illustrated in Fig. 1a;

Fig. 4 illustrates a filter synthesis providing a satisfactory reproduction of a square wave;

Fig. 5 illustrates a filter synthesis for the linear combination of a constant level and exponential signal; and Fig. 6 illustrates a filter synthesis for passing the linear combination of three signals;

Figure 1A:
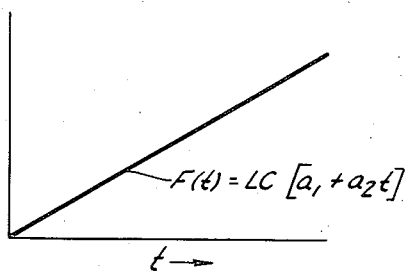
Fig. 1a illustrates a typical time domain function which may be filtered in accordance with the present invention.

(a) $e^{-t}$
(b) $e^{-t} \sin 1000t$
(c) $e^{-t} \cos 1000t$

The discussion which follows will be separated into four principal parts all of which are also contained in an article by Louis A. Ule entitled "Weighted least-squares smoothing filters," IRE Transactions on Circuit Theory, vol. CT-2, No. 2, June 1955. In part I the technique of least squares curved fitting will be generalized and modified to introduce an error weighting function. The discussion in this part then will not be particularly directed to the filter problem but rather will develop basic mathematical theory. Following part I the basic theory will be extended to linear filters in part II. After this the basic weighting function $W(t)$ of the filter will be derived in part III, and finally the filter design procedure will be discussed in part IV to indicate the technique of network synthesis which is employed to provide actual circuits defined in accordance with the theory of the invention. This part will include several specific examples of circuits shown in the various figures of the drawings.

I. Weighted least squared error in curve fitting

A curve can always be fitted exacly to a set of data but such a curve is not always the best representation of the variable of which the data are measurements. If the variable, for example, must obey some physical law, it may well be the solution to an $n$th order differential equation and hence known to have the form:

$$F(x) = LC[f_1(x), f_2(x), \ldots, f_n(x)] \quad (1)$$

where by LC we mean "linear combination of" and where $f_1(x), f_2(x), \ldots, f_n(x)$ are known functions of the variable x. A set of measurements of $F(x)$, because of unavoidable errors of measurement, will not be representable in the form of Equation 1. A new function $S(x)$ may be found which has the form (1) and differs at least in some way from the given data. $S(x)$ will then represent a best conclusion drawn from two pieces of evidence: foreknowledge of $F(x)$ and measurements on it. If the measurements be called $M(x)$ and $S(x)$ is their smoothed value, the weighted squared error for any $x$ will be:

$$[M(x) - S(x)]^2 H(x)$$

where $H(x)$ is an arbitrarily chosen error weighting function. The cumulative weighted squared error we define as $$E = \int_{-\infty}^{0} [M(x) - S(x)]^2 H(x) dx \quad (2)$$

It is this quantity that is to be minimized.

The introduction of the error weighting function $H(x)$ adds no complications and has several advantages. It can be so specified as to permit an infinite interval to be considered and yet have E be finite; also, $H(x)$ may be made large in those intervals where the data $M(x)$ are most significant or where the error of measurement is known to be least. Data $M(x)$ then, instead of being weighed uniformly may be weighed according to their validity.

If $S(x)$ is written as $$S(x) = \sum_{i=1}^{n} a_i f_i(x) \quad (3)$$

and the following is performed $$\frac{\partial E}{\partial a_j} = 0, \quad j = 1, 2, \ldots, n \quad (4)$$

for the minimum weighted squared error a set of $n$ linear simultaneous equations for the coefficients $a^i$ is obtained. These are:

$$\int_{-\infty}^{0} M(x) f_j(x) H(x) dx = \int_{-\infty}^{0} a_i f_i(x) f_j(x) H(x) dx,$$

$$j = 1, 2, \ldots, n \quad (5)$$

Upon defining:

$$I_j = \int_{-\infty}^{0} M(x) f_j(x) H(x) dx \quad (6)$$

and $$b_{ij} = \int_{-\infty}^{0} f_i(x) f_j(x) H(x) dx \quad (7)$$

Equation 5 provides a series of equations which may be written as follows:

$$I_1 = b_{11}a_1 \ldots b_{n1}a_n$$
$$\vdots$$
$$I_n = b_{1n}a_1 \ldots b_{nn}a_n$$

These equations then may be expressed in matrix form as:

$$\begin{vmatrix} I_1 \\ \vdots \\ I_n \end{vmatrix} = \begin{vmatrix} b_{11} & \ldots & b_{n1} \\ \vdots & & \vdots \\ b_{in} & \ldots & b_{nn} \end{vmatrix} \begin{vmatrix} a_1 \ldots a_n \end{vmatrix} \quad (8)$$

The inverse of the symmetrical matrix $(b_{ij})$ will exist except for some particular choice of $H(x)$ for the functions $f_i(x)$. The numbers $b_{ij}$ are all assumed to be finite. That solutions exist at all is easy to show. If, for example, the $f_i(x)$ are orthogonal functions with the weight function $H(x)$ over the interval $-\infty < x < 0$, the matrix $(b_{ij})$ will be a diagonal matrix whose inverse is obtained by inspection. Designating the inverse of the matrix $(b_{ij})$ by $(c_{jk})$, then, the values of the coefficients $a_j$ are $$a_j = \sum_{k=1}^{n} c_{jk} I_k, \quad j=1, 2, \ldots, n \quad (9)$$

substitution of which into (3) gives the smoothed value of the measurements $M(x)$ as follows:

$$S(x) = \sum_{j=1}^{n} \sum_{k=1}^{n} c_{jk} I_k f_j(x). \quad (10)$$

Equation 10 is conveniently interpreted as the product of three matrices.

II. *Extension to linear filters*

For a linear filter to perform continuously the curve fitting operation outlined above, it would at any instant of time have taken the data $M(x)$ as its input and produced at its output the value $S(x)$. Hence the variable $x$ would always be measured from the present. A clock reading $x$ time in our time would stand still. In addition, the filter cannot be required to weigh future information: if it is to predict, it must do so on the basis of past information. Finally, for the problem at hand, it must be understood, considering (10), the filter will be specified by the class of functions $f_j(x)$ which it is to smooth. If the filter is not going to have to continually adapt its internal structure to fit the signal, these functions $f_j(x)$ must not continually change into new functions. But the input to a filter is in real time and the input function $f_j(t+x)$ at some time other than the present (i. e., $x=0$), may not be a function for which the filter was designed.

For the function $f_j(t+x)$ to belong to the set of functions defined by (1) for all $x$, we must be able to express it as a linear combination of $f_1(t), f_2(t), \ldots, f_n(t)$. That is, there must exist functions $p_{jk}(x)$ such that:

$$f_j(t+x) = \sum_{k=1}^{n} p_{jk}(x) f_k(t), j=1, \ldots, n \quad (11)$$

For $x=0$, the right hand member of (11) should reduce to $f_j(t)$. Assuming the $p_{jk}(x)$ to be continuous functions of $x$ and expanding them about zero in a Taylor series this requires for $x$ small enough that:

$$p_{jk}(x) = xq_{jk}, \text{ for } j \neq k$$
$$p_{jk}(x) = 1 + xq_{jk}, \text{ for } j=k \quad (12)$$

The numbers $q_{jk}$ are just constants. Substituting (12) into (11) and letting $x$ approach zero we obtain in the limit:

$$\frac{df_j(t)}{dt} = \sum_{k=1}^{n} q_{jk} f_k(t), j=1, 2, \ldots n \quad (13)$$

The functions which can be smoothed by a particular linear filter must then be set of solutions to a particular $n$th order linear homogeneous differential equation with constant coefficients. These functions are exponentials, sinusoids and polynominals as well as possible sums of products of such functions. We shall call them E functions rather than polynominals because the general solution to a linear homogeneous differential equation with constant coefficients is a sum of exponentials with polynominal terms found in the solution only in the case of multiple roots. A set of $n$E functions comprising all the solutions of an $n$th order linear homogeneous differential equation with constant coefficients will be called a complete set. Exact filters can be designed only for complete sets of E functions.

III. *Weighting function of the filter*

If Equation 6 is substituted into (10) the following is obtained $$S(x) = \int_{-\infty}^{0} \Sigma\Sigma c_{jk} f_j(x) f_k(y) M(y) H(y) dy \quad (14)$$

where a new variable of integration $y$ is chosen to avoid confusion. $S(x)$ can here be considered as the output at the present time $t=0$ of a filter whose input is $M(y)$. If $M(y)$ is expressible as a function of the form (3) and if the filter is a least squared error filter, then $S(x)$ should exactly reproduce $M(y)$. For $x$ positive, the filter should exactly predict $M(y)$ by $x$ seconds, and if $x$ is negative $S(x)$ should lag $M(y)$ by $x$ seconds. Hence $x$ in (14) is the prediction time of the filter. Therefore (14) may be interpreted as a convolution integral giving the output at $t=0$ of a filter with prediction time $x$. That is, $$S(0, x) = \int_{-\infty}^{0} W(x, 0-y) M(y) dy \quad (15)$$

where $W(x, t)$ is the weighting function of a filter which predicts by $x$ seconds expressed in conventional form, M is the input and S is the output. Identifying (14) and (15), the weighting function of the filter is obtained as the expression:

$$W(x, 0-y) = W(x, t) = H(-t) \Sigma\Sigma f_k(-t) c_{jk} f_j(x) \quad (16)$$

which can be represented as the product of three matrices as follows:

$$W(x, t) = H(-t)[f_1(-t) \ldots f_n(-t)] \begin{bmatrix} c_{11} & \ldots & c_{1n} \\ \vdots & & \vdots \\ c_{n1} & \ldots & c_{nn} \end{bmatrix} \begin{bmatrix} f_1(x) \\ \vdots \\ f_n(x) \end{bmatrix}$$
(17)

for $t \geq 0$ and, $$W(x, t) = 0, \text{ for } t<0$$

The weighting function of the smoothing filter is thus obtained which predicts or delays by any desired amount signals for which it was designed. Filters which perform other linear operations such as obtaining smooth derivatives or integrals are obtained with equal facility. In addition a single filter can be made to perform smoothly any linear combination of these operations on an input signal.

IV. *Filter design procedure*

In view of the foregoing a weighted least squared error filter can be designed in the following way. Something must first be known about the expected signal. If possible the linear homogeneous differential equation with constant coefficients of lowest order which the signal satisfies should be found. If this is not possible the lowest order suitable approximation should be found (i. e., $n$ as small as possible) where $$F(t) = LC[f_1(t), \ldots, f_n(t)] \quad (18)$$

and the functions $f_1(t), \ldots, f_n(t)$ are a complete set of E functions. The next step is to choose the error weighting function $H(t)$. Typical choices for this function might be $$H(t) = u(-t) - u(-t-1)$$
$$H(t) = e^t$$
$$H(t) = t^n e^t$$
$$H(t) = e^t \sin^2 t \quad (19)$$
$$H(t) = e^{-t^2}$$

In all cases $H(t)$ is zero for $t$ positive—the filter will not be asked to weigh the future. Furthermore an admissible choice of $H(t)$ may depend upon the functions $f_j(t)$, either for the numbers $b_{ij}$ to be finite or for the inverse of the $b_{ij}$ matrix to exist. The rapidity with which $H(t)$ approaches zero as $t$ approaches minus infinity will specify the memory of the filter, its speed of response, settling time and whether the filter will ring or be critically damped. The choice of $H(t)$ proportional to $e^{at}$, where $e$ is the natural logarithmic base and $a$ is any positive real constant is preferred because a filter transfer function is thus obtained from which filters may be synthesized as a driving point impedance to a ladder network of lossy inductors and capacitors. The value of $a$ may be reduced by a desired amount to decrease the bandwith of the filter or to make the numbers $b_{ij}$ finite or to make the inverse of the $b_{ij}$ matrix exist.

Having chosen $H(t)$ the next step is to compute the elements of the $b_{ij}$ matrix using Equation 7:

$$b_{ij} = \int_{-\infty}^{0} f_i(x) f_j(x) H(x) dx \qquad (7)$$

The matrix $(b_{ij})$ is then inverted. Using the inverted matrix $(c_{jk})$ at once the weighting function of the desired filter is obtained by (17):

$$W(x,t) = H(-t)[f_1(-t) \ldots f_n(-t)] \begin{bmatrix} c_{11} & \ldots & c_{1n} \\ \vdots & & \vdots \\ c_{n1} & \ldots & c_{nn} \end{bmatrix} \begin{bmatrix} f_1(x) \\ \vdots \\ f_n(x) \end{bmatrix} \qquad (17)$$

For network synthesis it is convenient to work with the filter transfer function. This is simply the Laplace transform of $W(x, t)$; namely, $$Z(x, s) = \int_{0}^{\infty} e^{-st} W(x, t) dt \qquad (20)$$

APPLICATION OF THEORY TO SPECIFIC CIRCUITS

To begin with a simple example it will be assumed that the signal $F(t)$ is known to obey the relationship:

$$\frac{d^2 F}{dt^2} = 0 \qquad (21)$$

and that therefore:

$$F(t) = LC[a_1, a_2 t] \qquad (22)$$

where $a_1$ and $a_2$ may assume any constant values.

If the weighting function $H(t)$ is made to vanish over an interval for finite $t$, it will now be shown that a delay line type of impedance is specified, such as is required in practicing the technique of Zadah and Ragazzini mentioned above. For this illustration it will be assumed that the function will weigh uniformly just past one second of its input and ignore all previous inputs so that:

$$H(t) = u(-t) - u(-t-1) \qquad (23)$$

Utilizing Equation 7 above we may obtain the elements of the $b_{ij}$ matrix, where the limits defined in Equation 7 are modified in accordance with the selection of the weighting function $H(t)$, as follows:

$$b_{11} = \int_{-1}^{0} dx = 1$$
$$b_{12} = b_{21} = \int_{-1}^{0} x\, dx = -1/2 \qquad (24)$$
$$b_{22} = \int_{-1}^{0} x^2 dx = 1/3$$

where $a_1 = a_2 = 1$ is assumed for simplicity.

The inverse matrix $c_{jk}$ is then:

$$\begin{bmatrix} 1 & -1/2 \\ -1/2 & 1/3 \end{bmatrix}^{-1} = \begin{bmatrix} 4 & 6 \\ 6 & 12 \end{bmatrix} \qquad (25)$$

and by (17) the expression for $W(x, t)$ is:

$$W(x, t) = \{u(t) - u(t-1)\}[1 - t]\begin{bmatrix} 4 & 6 \\ 6 & 12 \end{bmatrix}\begin{bmatrix} 1 \\ x \end{bmatrix} \qquad (26)$$

If prediction is not required, $x = 0$ and $$W(t) = 4 - 6t, \text{ for } -1 < t < 0 \qquad (27)$$
$$= 0, \text{ otherwise}$$

The transfer impedance of this filter may be found then by solving the Laplace integral:

$$Z(s) = \int_{0}^{1} e^{-st}(4 - 6t)\, dt \qquad (27a)$$

$$Z(s) = \left[\frac{4e^{-st}}{-s} + \frac{6}{s^2} e^{-st}(st + 1)\right]_{0}^{1} \qquad (27b)$$

providing the transfer function:

$$Z(s) = \frac{4}{s}(1 - e^{-s}) + \frac{6}{s^2}[(s+1)e^{-s} - 1] \qquad (27c)$$

The presence of the delay term $e^{-st}$ makes it apparent that construction of this filter will require some sort of delay device.

It will now be shown that by utilizing a continuous error weighting function of time $H(t)$ in accordance with the invention the same filtering may be accomplished with simple lump constant elements. In this example it will be assumed that $H(t)$ is defined as follows:

$$H(t) = e^t \qquad (28)$$

The elements of the $b_{ij}$ matrix are then defined by 7 as follows:

$$b_{11} = \int_{-\infty}^{0} e^t dt = 1$$
$$b_{12} = b_{21} = \int_{-\infty}^{0} t e^t dt = -1$$
$$b_{22} = \int_{-\infty}^{0} t^2 e^t dt = 2 \qquad (29)$$

and the $c_{jk}$ matrix is $$c_{jk} = \begin{bmatrix} 1 & -1 \\ -1 & 2 \end{bmatrix}^{-1} = \begin{bmatrix} 2 & 1 \\ 1 & 1 \end{bmatrix} \qquad (30)$$

whence $$W(x,t) = e^{-t}[1 \quad -t]\begin{bmatrix} 2 & 1 \\ 1 & 1 \end{bmatrix}\begin{bmatrix} 1 \\ x \end{bmatrix}$$
$$= e^{-t}[2 + x - t(1 + x)] \qquad (31)$$

The transfer function of this filter is found to be:

$$Z(x, s) = \frac{(2+x)s + 1}{(s+1)^2} \qquad (32)$$

If the prediction time is zero ($x = 0$) the impedance function then becomes $$Z(s) = \frac{2s + 1}{(s+1)^2} \qquad (33)$$

which is readily synthesized with lumped constant elements as a driving point impedance to a ladder.

Figure 1B:
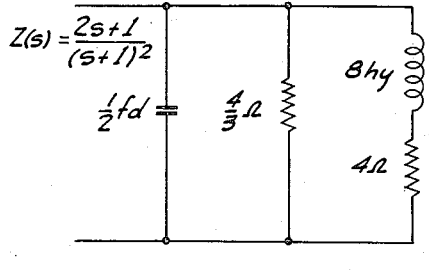

The general form of the time domain function which is being considered here and the characteristic ladder are shown in Figs. 1a and 1b, respectively. The particular ladder constants may be derived in a simple manner by ascertaining the admittance of each element as follows:

$$\begin{array}{r} s/2 + 3/4 + 1/(8s+4) \\ 2s+1 \overline{)s^2 + 2s + 1} \\ \underline{s^2 + \dfrac{s}{2}} \\ \dfrac{3}{2}s + 1 \\ \underline{\dfrac{3}{2}s + 3/4} \\ 1/4 \end{array}$$

The admittance $$\frac{s}{2}$$

is then provided by a capacitor of ½ farad, the admittance of term of ¾ is provided by a resistor of 4/3 ohms, and the admittance term of $$\frac{1}{8s + 4}$$

will be readily recognized as the series connection of an inductor of 8 henrys and a resistor of 4 ohms.

The above example is not intended to illustrate a practical circuit form but rather the general configuration of the ladder network. A network with more practical element values may be obtained, either by an impedance level change, or a bandwidth change or both. Alternatively the network can be synthesized with feedback amplifiers—the only practical choice when the bandwidth is narrow.

The manner in which the feedback amplifier may be employed to simulate the desired impedance function is more specifically illustrated in Fig. 1c where the filter again is designed in accordance with the transfer function:

$$Z(s) = \frac{2s+1}{(s+1)^2}$$

Figure 1C:
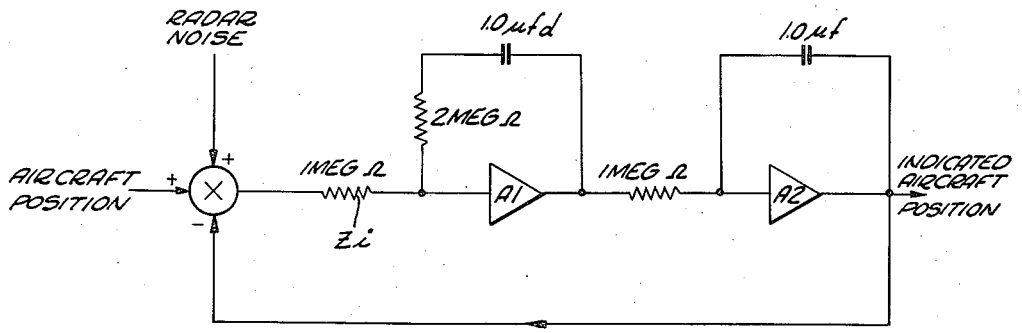

It will also be noted that Fig. 1c has been designed to illustrate a typical application for the invention wherein aircraft position information is to be filtered out of radar noise and is known to be trajectory information which may be approximated by a polynomial of the first order.

The impedance function achieved through the first feedback amplifier A1 may be defined in a well-known manner to be equal to the ratio of the input atmittance $Y_i^1$ over the feedback admittance $Y_f^1$. This then provides the impedance function $$Z1 = \frac{Y_i^1}{Y_f^1} = \frac{\frac{10^{-6}}{1}}{2 \times 10^6 + \frac{1}{s \times 10^{-6}}} = \frac{2s+1}{s} \quad (33b)$$

In a similar manner Z2 may be defined as follows:

$$Z2 = \frac{Y_i^2}{Y_f^2} = \frac{10^{-6}}{10^{-6}s} = \frac{1}{s} \quad (33c)$$

The open loop impedance G then for the arrangement of Fig. 1c is found to be:

$$G(\text{open loop}) = \frac{2s+1}{s^2} \quad (33d)$$

and the complete unity gain feedback transfer function $Z(s)$ is then found to be:

$$Z(s) = \frac{G}{1+G} = \frac{\frac{2s+1}{s^2}}{1+\frac{2s+1}{s^2}}$$

$$= \frac{2s+1}{(s+1)^2} \quad (33e)$$

Another way of deriving this particular filter would have been to define F(t) as the sum of Laguerre polynomials $L_K$. Since these are orthonormal with respect to the weight function $e^{-t}$ over the interval positive $t$, the $b_{ij}$ matrix is a unit diagonal matrix. The expression W(t) would then simply be:

$$W(x,t) = e^{-t}[L_0(t)L_0(-x) + L_1(t)L_1(-x)] \quad (34)$$

$$W(t) = e^t[L_0(t) + L_1(t)] \quad (35)$$

which agrees with Equation 31 since $$L_0(t) = 1$$
$$L_1(t) = 1 - t \quad (36)$$

It is then possible to obtain the weighting function for filters of polynomials of the $n$th degree with an error weighting function $e^t$ in this manner. This function becomes:

$$W_n(x,t) = e^{-t} \sum_{k=0}^{n} L_k(t) L_k(-x) \quad (37)$$

The Laplace transform of this weighting function for the prediction time $x=0$ is then:

$$Z_n(s) = 1 - \left(\frac{s}{s+1}\right)^{n+1} \quad (38)$$

Figure 2:
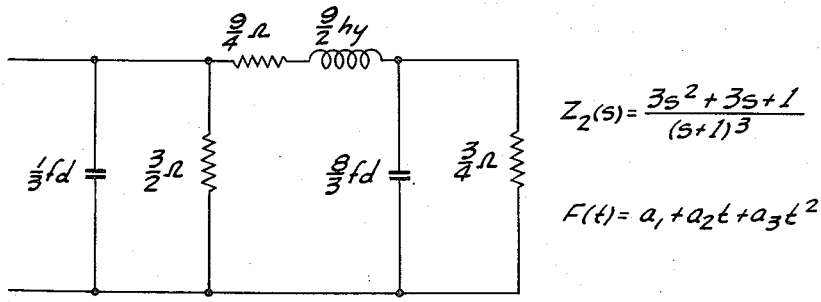
Figs. 2 and 3 illustrate syntheses of filters for passing polynominal series functions of the second and third degrees, respectively.

Two other syntheses of this transformation function are illustrated in the drawing by way of example. Fig. 2 shows the synthesis of $Z_2(s)$ in the form of a ladder of lossy coils and lossy condensers. This ladder may be derived as above in (33a) by first determining the admittance input term and then treating the remaining term as an impedance. The other example is the synthesis of a filter utilizing a feedback amplifier, resistors and condensers where the expected signal is a polynomial in the third degree. In this case the transfer impedance is:

$$Z_3(s) = 1 - \left(\frac{s}{s+1}\right)^4 = \frac{4s^3 + 6s^2 + 4s + 1}{(s+1)^4} \quad (38a)$$

Figure 3:
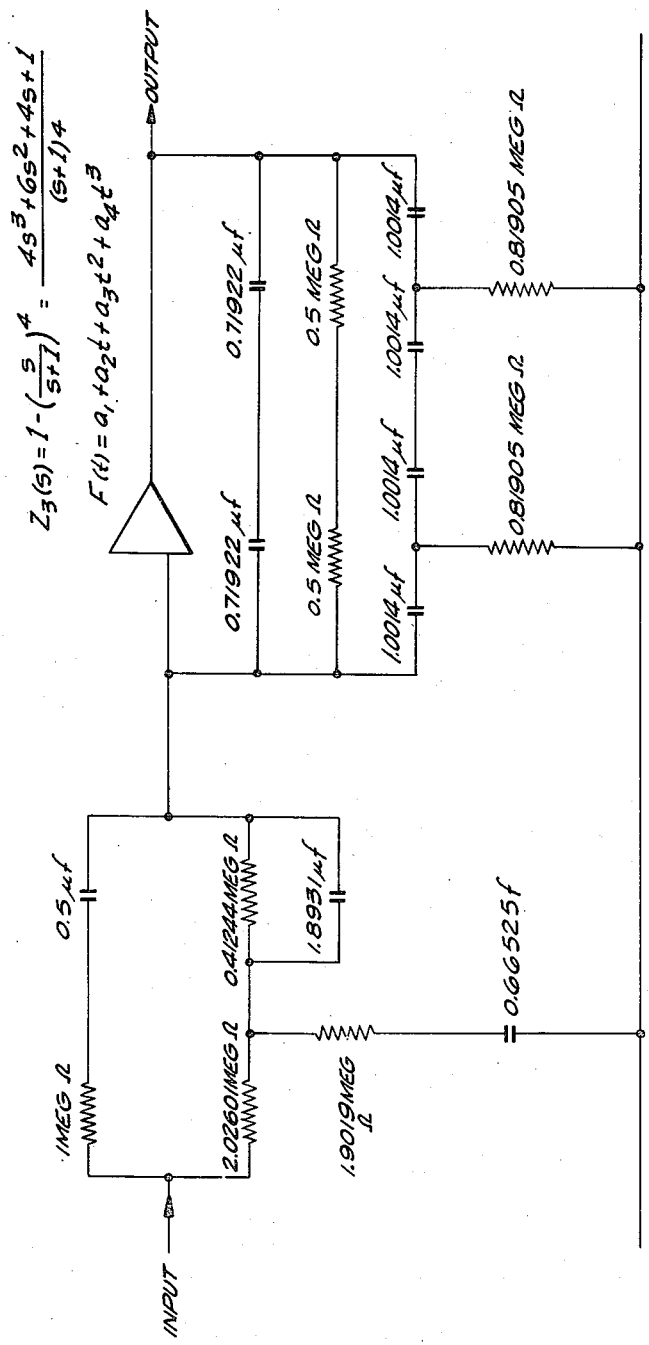

The mechanization is shown in Fig. 3 where the transfer function has been broken up into two factors as follows:

$$4 \frac{s^2 + s + .5}{(s+2)(s+.6096)} \times \frac{(s+2)(s+.6096)(s+.5)}{(.6096)(s+1)^4} \quad (38b)$$

The first factor, excluding the 4, is realizable as the forward network and the second factor as the feedback network.

Filters may also be designed for periodic signals, such as a square wave. This will be illustrated by assuming that a satisfactory reproduction of the square wave is found in the fundamental and third harmonics. Assuming a simple example where the frequencies are 1 and 3 radians, we then have:

$$F(t) = LC\ [e^{jt},\ e^{-jt},\ e^{3jt},\ e^{-3jt}] \quad (39)$$

To get simple numbers we choose $H(t) = 20e^{2t}$. The resulting $b_{ij}$ matrix is then by (7):

$$\begin{bmatrix} 5-5j & 10 & 2-4j & 5+5j \\ 10 & 5+5j & 5-5j & 2+4j \\ 2-4j & 5-5j & 1-3j & 10 \\ 5+5j & 2+4j & 10 & 1+3j \end{bmatrix} \quad (40)$$

Upon inversion of this matrix we obtain the following expression for the filter weighting function:

$$W(x_t) =$$

$$\frac{e^{-2t}}{9}[e^{-jt}e^{jt}e^{-3jt}e^{3jt}]$$

$$\begin{bmatrix} 9-63j & 90 & -30 & -15+45j \\ 90 & -9+63j & -15-45j & -30 \\ -30 & -15-45j & -15+45j & 50 \\ -15+45j & -30 & 50 & -5-15j \end{bmatrix} \begin{bmatrix} e^{jx} \\ e^{-jx} \\ e^{3jx} \\ e^{-3jx} \end{bmatrix}$$

$$(41)$$

where again, $x$ is the prediction time. For $x=0$, the Laplace transform $Z(s)$ of $W(t)$ is:

$$Z(s) = \frac{8s^3 + 24s^2 + 72s + 56}{s^4 + 8s^3 + 34s^2 + 72s + 65} \quad (42)$$

The synthesis of this function is shown in Fig. 4 as a driving point impedance. It will be understood again that the figure merely illustrates the general form of the circuit and is not intended to represent a specific arrangement.

As a somewhat more unusual example, consider F(t) to be defined by $$F''(t) + F'(t) = 0 \quad (43)$$

so that $$F(t) = LC[1,\ e^{-t}] \quad (44)$$

A choice of an exponential error weighting function would here be convenient, however, for the numbers $b_{ij}$ to be finite the exponent must be greater than $2t$. We therefore choose $$H(t) = e^{3t} \quad (45)$$

Calculating the elements of the $b_{ij}$ matrix by (7) and inverting the matrix we arrive at the following expression for the filter weighting function:

$$W(x, t) = e^{-3t}[1, \ e^t] \begin{bmatrix} 12 & -6 \\ -6 & 4 \end{bmatrix} \begin{bmatrix} 1 \\ e^{-x} \end{bmatrix} \quad (46)$$

For zero prediction time $$W(t) = 6e^{-3t} - 2e^{-2t} \quad (47)$$

and $$Z(s) = \frac{4s+6}{s^2+5s+6} \quad (48)$$

This general form of synthesis for this function is shown in Fig. 5.

As a final example consider the design of a filter in accordance with the invention which will pass the following three components without steady state error:

(a) $e^{-t}$
(b) $e^{-t} \sin 1000t$       (49)
(c) $e^{-t} \cos 1000t$ where the filter has a smoothing time of about ⅓ second; i. e. a bandwidth of about ½ cycle per second.

The filter is unconditionally stable when used as a feedback network in a closed loop system due to the fact that error weighting function $H(t)$ is again selected as:

$$H(t) = e^{at}$$

where $a$ is a positive constant. This means, as above, that the transfer function is realized as an input impedance to a passive ladder and therefore cannot exhibit more than a 90° phase shift.

The requirement of a smoothing time of about ⅓ second implies that:

$$H(t) = e^{\frac{t}{1/3}} = e^{3t} \quad (50)$$

We have then that:

$$F(t) = LC\ [e^{-t},\ e^{-t} \sin 1000t,\ e^{-t} \cos 1000t]$$
$$H(t) = e^{3t} \quad (51)$$

$b_{11} = 1$
$b_{12} = b_{21} - .001$
$b_{13} = b_{31} - .000001$
$b_{22} - ½$
$b_{23} = b_{32} - .00025$
$b_{33} - ½$

The inversion of this matrix is tedious. The resulting transfer function (with zero prediction) turns out to be to an approximation close enough for any practical purpose:

$$\frac{3s^2 + 9s + 1,000,006}{(s+2)[(s+2)^2 + (1,000)^2]}$$

The transfer function may be divided into separate sections as follows:

Input network:

$$60,000 \frac{1 + s/2}{1 + \frac{9}{10^6}s + \frac{3}{10^6}s^2}$$

Feedback network:

$$90,000 \frac{1 + s/3}{1 + \frac{4}{10^6}s + \frac{s^2}{10^6}}$$

Output network:

$$\frac{3}{1 + s/3}$$

This can be realized using a single operational amplifier as shown in Fig. 6.

The overall response has a gain of three over that required. This is no drawback since in the closed loop, this can be compensated for, if necessary, by a loss of ⅓ in the forward section of the loop—in any case the loop will be stable regardless of gain.

I claim:

1. A filter for deriving an output signal $S(t)$ from an input data signal $M(t)$ with a least squared error in the output signal, the useful signal information in $M(t)$ being known to include a function $F(t)$ in the form of a linear combination of a number of signals, $n$, forming solutions $f_1(t), f_2(t) \ldots f_n(t)$ to a linear homogeneous differential equation with the corresponding constant coefficients whereby the signal $S(t)$ may be defined as:

$$S(t) = \sum_{i=1}^{n} a_i f_i(t)$$

where $i = 1, 2, 3, \ldots n$ and $a_i = a_1, a_2, a_3, \ldots a_n$ are said constant coefficients, said filter comprising a circuit for minimizing the error interval E defined as $$E = \int_{-\infty}^{0} [M(t) - S(t)]^2 H(t) dt$$

where $H(t)$ is an error weighting function; the minimized error integral E providing the relationship:

$$\int_{-\infty}^{0} M(t) f_j(t) H(t) dt = \int_{-\infty}^{0} a_i f_i(t) f_j(t) H(t) dt$$
$$j = 1, 2, \ldots, n$$

from which the constants $a_j$ are found to be:

$$a_j = \sum_{k=1}^{n} c_{jk} I_k, \qquad j = 1, 2, \ldots, n$$

so that the output signal $S(t)$ with minimized error is definable as:

$$S(t) = \int_{-\infty}^{0} \sum_{j=1}^{n} \sum_{k=1}^{n} c_{jk} f_j(x) f_k(t) M(t) H(t) dt$$

and the weighting function for the circuit is:

$$W(x, t) = H(-t) \sum_{j=1}^{n} \sum_{k=1}^{n} f_k(-t) c_{jk} f_j(x)$$

where $$\sum_{j=1}^{n} \sum_{k=1}^{n} f_k(-t) c_{jk} f_j(x)$$

is the product of three matrices $$[f_1(-t) \ldots f_n(-t)] \begin{bmatrix} c_{11} & \ldots & c_{1n} \\ \vdots & & \vdots \\ c_{n1} & \ldots & c_{nn} \end{bmatrix} \begin{bmatrix} f_1(x) \\ \vdots \\ f_n(x) \end{bmatrix}$$

where $x$ is the prediction time of the circuit.

2. The invention as defined in claim 1, wherein said function $F(t)$ is a polynomial of the $n$th degree and the weighting function $W_n(x, t)$ with an error weighting function $e^t$ becomes $$W_n(x, t) = e^{-t} \sum_{k=0}^{n} L_k(t) L_k(-x)$$

the Laplace transform of which is $$Z_n(s) = 1 - \left(\frac{s}{s+1}\right)^{n+1}$$

3. The invention as defined in claim 2, wherein said circuit includes a network mechanized in accordance with the Laplace transform:

$$Z(x, s) = \int_{0}^{\infty} e^{-st} W(x, t) dt$$

where $s$ is the Laplace transform operator, and said Laplace function $Z(x, s)$ is realizable as a finite lumped constant apparatus and the contribution of the input data $M(t)$ may be emphasized at those times when the data are known to be most reliable.

4. The circuit defined in claim 2 wherein $n=1$ and the prediction variable $x=0$;

said Laplace transform function being then:

$$Z(s) = \frac{2s+1}{(s+1)^2}$$

and being operable to filter information relating to an expected time domain signal $F(t) = LC[a_1 + a_2 t]$, where LC denotes the linear combination of the terms $a_1$ and $a_2 t$.

5. The invention as defined in claim 2, wherein $n=3$ and the prediction variable $x=0$; said Laplace transform being then:

$$Z_3(s) = \frac{4s^3 + 6s^2 + 4s + 1}{(s+1)^4}$$

and being operable to filter an expected signal which is a polynomial function of time in the third degree.

6. The invention as defined in claim 1, wherein said expected signal $F(t)$ may be defined as follows:

$$F(t) = LC[e^{jt}, e^{-jt}, e^{3jt}, e^{-3jt}]$$

where LC means the linear combination of the terms $e^{jt}$, $e^{-jt}$, $e^{3jt}$, $e^{-3jt}$, said circuit comprising a network mechanized in accordance with the Laplace transform:

$$Z(x,s) = \int_0^\infty e^{-st} W(x,t) dt$$

said Laplace transform function for $x=0$ then becoming $$Z(s) = \frac{8s^3 + 24s^2 + 72s + 56}{s^4 + 8s^3 + 34s^2 + 72s + 65}$$

said prediction function $x$ being equal to 0.

7. The invention as defined in claim 2, wherein said expected signal $F(t)$ may be defined as follows:

$$F(t) = LC[1, e^{-t}]$$

where LC stands for the linear combination of 1 and $e^{-t}$; said circuit comprising a network mechanized in accordance with the Laplace transform:

$$Z(x,s) = \int_0^\infty e^{-st} W(x,t) dt$$

said Laplace transform function for $x=0$ then becoming $$Z(s) = \frac{4s+6}{s^2 + 5s + 6}$$

said prediction function $x$ being equal to 0.

8. The invention as defined in claim 1, wherein the expected signal includes three components, viz. $e^{-t}$, $e^{-t} \sin 1000t$, and $e^{-t} \cos 1000t$, said circuit comprising a network mechanized in accordance with the Laplace transform:

$$Z(x,s) = \int_0^\infty e^{-st} W(x,t) dt$$

said Laplace transform for said expected signals then being equal to $$\frac{3s^2 + 9s + 1{,}000{,}006}{(s+2)[(s+2)^2 + (1{,}000)^2]}$$

No references cited.